No. 866,409.

PATENTED SEPT. 17, 1907.

C. A. VOGLER.
COOKING UTENSIL.
APPLICATION FILED MAY 10, 1907.

WITNESSES
L. Walker
John K. Blackwood

INVENTOR
Charles A. Vogler
BY
Munn & Co.
ATTORNEYS

UNITED STATES PATENT OFFICE.

CHARLES AUGUST VOGLER, OF BAKER, WASHINGTON, ASSIGNOR OF ONE-HALF TO MARTIN NELSON, OF BAKER, WASHINGTON.

COOKING UTENSIL.

No. 866,409.  Specification of Letters Patent.  Patented Sept. 17, 1907.

Application filed May 10, 1907. Serial No. 372,889.

*To all whom it may concern:*

Be it known that I, CHARLES AUGUST VOGLER, a citizen of the United States, and a resident of Baker, in the county of Skagit and State of Washington, have invented a new and Improved Cooking Utensil, of which the following is a full, clear, and exact description.

This invention relates to cooking utensils, and it is particularly useful in connection with devices of this character intended for the use of campers and others employing an open fire, but it is also adapted for use on or in a stove.

The object of the invention is to provide a simple, strong and inexpensive cooking utensil having opposite pan sections which can be used separately and which, when arranged in mutual engagement, form a closed receptacle.

A further object of the invention is to provide a utensil of this character having handles hinged thereto and adapted to be folded into the pans when the device is not in use, the handles having removable handle extensions for the purpose of lengthening the same.

The invention consists in the construction and combination of parts to be more particularly described hereinafter and more fully set forth in the claims.

Reference is to be had to the accompanying drawings forming a part of this specification, in which similar characters of reference indicate corresponding parts in all the views.

Figure 1:
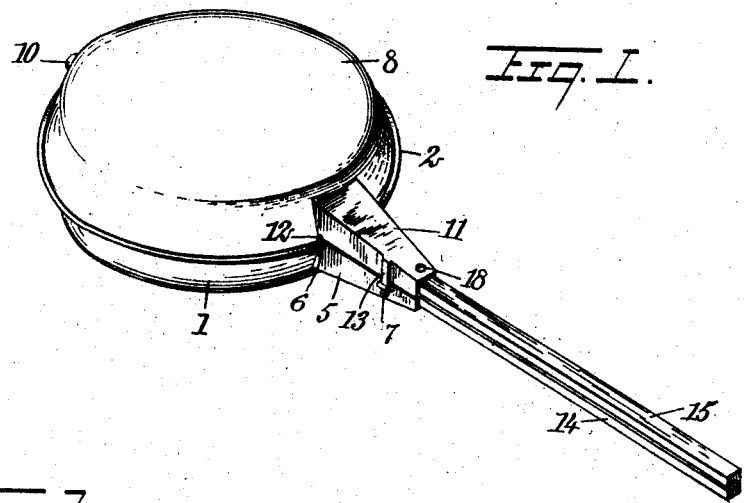
Figure 2:
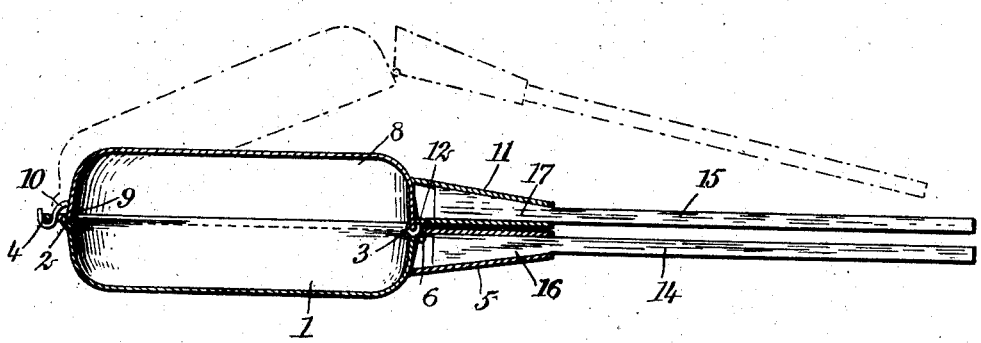
Figure 3:
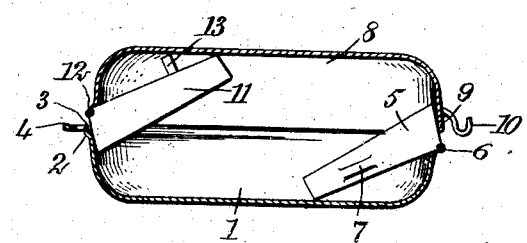

Figure 1 is a perspective view of the device; Fig. 2 is a longitudinal vertical section showing a part in a different position in dotted outlines; and Fig. 3 is a vertical cross-section showing the utensil with the handles thereto therewithin.

Before proceeding to a more detailed explanation it should be understood that while the cooking utensil is adapted to be especially useful for campers and others necessarily employing an open fire, it will be found of utility in various forms of cooking upon stoves, in ovens, and the like.

The utensil comprises opposite pan sections removably hinged together and forming a closed receptacle; in cooking upon an open fire the closed form of the utensil is necessary to prevent ashes, cinders or other foreign bodies from entering the utensil and contaminating the food in a state of preparation. At the same time, it facilitates the turning of the food, as it is merely necessary to turn the pan in order to apply the heat to opposite sides of the object within the utensil. As the handles are foldable into inoperative position within the pans the device is well adapted for packing and transportation, where utensils of small compass are requisite.

Referring more particularly to the drawings, 1 represents a pan section, preferably round in form and constructed of sheet metal or any other similar material. The pan has a laterally extended and recessed rim 2 thereabout, presenting an annular groove 3; an integral eye 4 is arranged at the edge of the pan. At a point opposite to the eye 4, a hollow handle 5 is secured to the pan section 1 by means of a hinge 6 mounted at the edge of the pan and at the edge of the end of the handle. The handle is shown of square cross-section but a handle of other cross-section will answer the purpose equally well. The handle 5 tapers outwardly from the end mounted upon the pan and has at one side an integral eye 7. The handle 5 is arranged upon the open section so that in its extended position the inner end engages the side of the pan to prevent the movement of the handle, the face of the handle adjacent to the edge lying in a plane substantially parallel to the plane of the pan section rim.

An opposite pan section 8 is provided and has a plain rim 9 adapted to be arranged within the annular groove 3 of the rim of the opposite section. The section 8 has near one side a hook 10 adapted to engage the eye 4 to form a removable hinged connection between the pan sections. A handle 11, similar to the handle 5 is secured to the pan section 8 by means of a hinge 12 at a point corresponding to the point at which the handle 5 is mounted upon the section 1. When the pans are in position to form a closed receptacle the handles 5 and 11 lie adjacent and engage mutually to lock against movement in opposite directions, at the same time engaging the pan sections, thereby preventing movement in the opposite direction, respectively. The handle 11 has an integral leteral stud 13 engaging the eye 7 of the handle 5 to prevent the lateral displacement of the handles when in engagement.

Handle extensions 14 and 15, preferably of wood and having wedge-shaped parts 16 and 17 are provided for the purpose of lengthening the handles to enable the user to employ the device with an open fire, at the same time remaining a sufficient distance from the fire to escape the smoke and heat from the same. The handles 14 and 15 of the wedge shaped parts 16 and 17 jam within the tapering handles, the extensions being passed through the hollow handles until the wedge-shaped parts prevent further projection. If the operator desires to examine the food cooking within the utensil it is merely necessary to raise the handle 15 to disengage the stud 13 from the eye 7 and then force the handle 15 inwardly to raise the pan section 8 as shown in dotted outline in Fig. 2.

The handle 11 is provided with an opening 18 by means of which the utensil may be hung upon a hook or nail when not in use.

Having thus described my invention I claim as new, and desire to secure by Letters Patent:—

1. A cooking utensil, comprising pans fitting one upon the other and forming a closed receptacle, and a hollow handle secured to one of said pans and adapted to be folded into an inoperative position therewithin, said handle being shaped to receive a handle extension for lengthening the same.

2. A cooking utensil, comprising pans fitting one upon the other and forming a closed receptacle, means for removably hinging said pans one to the other, and a hollow handle secured to one of said pans and adapted to be folded into an inoperative position therewithin, said handle being shaped to receive a handle extension for lengthening the same.

3. A cooking utensil, comprising pans removably fitting one upon the other and forming a closed receptacle, means for removably securing said pans one to the other, and a hollow handle hinged to one of said pans and adapted to be folded into an inoperative position therewithin, said handle having an end adapted to engage a pan to limit the movement of the handle in one direction when the latter is extended, said handle further being shaped to receive a handle extension for lengthening the same.

4. A cooking utensil, comprising pans removably fitting one upon the other and forming a closed receptacle, means for removably hinging said pans one to the other, a hollow handle hinged to one of said pans and adapted to be folded into an inoperative position therewithin, said handle having an end adapted to engage a pan to limit the movement of the handle in one direction when the latter is extended, said handle further being shaped to receive an end extension for lengthening the same.

5. A cooking utensil, comprising pans removably fitting one upon the other and forming a closed receptacle, one of said pans having a groove at the rim thereof adapted to receive the rim of the opposite pan, means for removably hinging said pans one to the other, a hollow handle hinged to one of said pans and adapted to be folded into an inoperative position therewithin, said handle in an extended position engaging said pans to prevent the movement of the handle in one direction, and a handle extension removably located within said hollow handle and extending therebeyond.

6. A cooking utensil, comprising pans removably fitting one upon the other and forming a closed receptacle, means for removably hinging said pans one to the other, a hollow tapering handle having hinged connection with one of said pans at an edge thereof and adapted to be folded into an inoperative position therewithin, and a handle extension having a wedge-shaped part adapted to be jammed within said hollow handle.

7. A cooking utensil, comprising pans fitting one upon the other and forming a closed receptacle, means for removably hinging said pans one to the other, and handles hinged to said pans at the edges thereof and arranged to fold into inoperative position within said pans, said handles lying adjacent and in mutual engagement, said handles further engaging said pans to prevent the movement of the respective handles in opposite directions.

8. A cooking utensil, comprising pans removably fitting one upon the other, means for removably hinging said pans one to the other, hollow tapering handles hinged to said pans at the edges thereof and arranged to fold into inoperative position within said pans, said handles lying adjacent and in engagement when extended and engaging said pans to limit the movement of the respective handles in opposite directions, and handle extensions having wedge-shaped parts and adapted to be removably secured within said handles and extending therebeyond, said handles having means engaging to lock the same against lateral displacement.

In testimony whereof I have signed my name to this specification in the presence of two subscribing witnesses.

CHARLES AUGUST VOGLER.

Witnesses:
 HENRY HURSHMAN,
 OSCAR BOHLAND.